United States Patent [19]

Chan et al.

[11] Patent Number: 5,974,115
[45] Date of Patent: Oct. 26, 1999

[54] SYSTEM AND METHOD FOR TESTING SUBSCRIBER LINES AND TERMINATING EQUIPMENT FROM A SERVICE PLATFORM

[75] Inventors: Jim H. Chan, Roswell; Stephen R. LaPierre, Union City, both of Ga.

[73] Assignee: BellSouth Intellectual Property Managment Corporation, Wilmington, Del.

[21] Appl. No.: 08/751,059

[22] Filed: Nov. 15, 1996

[51] Int. Cl.$^6$ .............................. H04M 1/24; H04M 3/08
[52] U.S. Cl. ................... 379/27; 379/29; 379/1
[58] Field of Search ................ 379/21, 22, 23, 379/24, 25, 26, 27, 28, 29, 30, 1, 5, 6, 9, 19, 8, 10, 12, 18

[56] References Cited

U.S. PATENT DOCUMENTS

| | | | |
|---|---|---|---|
| 4,670,898 | 6/1987 | Pierce et al. | 379/22 |
| 4,764,949 | 8/1988 | Faith et al. | 379/9 |
| 4,777,645 | 10/1988 | Faith et al. | 379/31 |
| 5,073,919 | 12/1991 | Hagensick et al. | 379/29 |
| 5,406,269 | 4/1995 | Baran | 379/40 |
| 5,490,199 | 2/1996 | Fuller et al. | 379/1 |
| 5,502,756 | 3/1996 | Crocker et al. | 379/29 |
| 5,615,225 | 3/1997 | Foster et al. | 379/29 |
| 5,799,060 | 8/1998 | Kennedy et al. | 379/29 |

*Primary Examiner*—Curtis A. Kuntz
*Assistant Examiner*—Rexford N. Barnie
*Attorney, Agent, or Firm*—Jones & Askew, LLP

[57] ABSTRACT

A system and method for testing the operation of a piece of terminating equipment or subscriber line through the use of a single service platform. A test call originating from the piece of terminating equipment or subscriber line under test is received. In response to receiving the test call, a transmission path is established from the piece of terminating equipment under test to the single service platform. The single service platform then transmits a menu message over the transmission path to the piece of terminating equipment under test. In response to transmitting the menu message, the single service platform receives a selection indicator over the transmission path, the selection indicator identifying a verification test to be provided. The selection indicator is then processed and the identified verification test is provided by the single service platform to the piece of terminating equipment. This system and method allows several verification tests to be available from a single service platform. Thus, the menu message transmitted to the piece of terminating equipment from the single service platform may contain several menu elements. Each element of the menu message represents one verification test or group of verification tests. In one embodiment, four verification tests are provided. These four test include: (1) audio announcement verification test; (2) call-back voice verification test; (3) call-back audio signal verification test; and (4) call-back facsimile verification test.

22 Claims, 4 Drawing Sheets

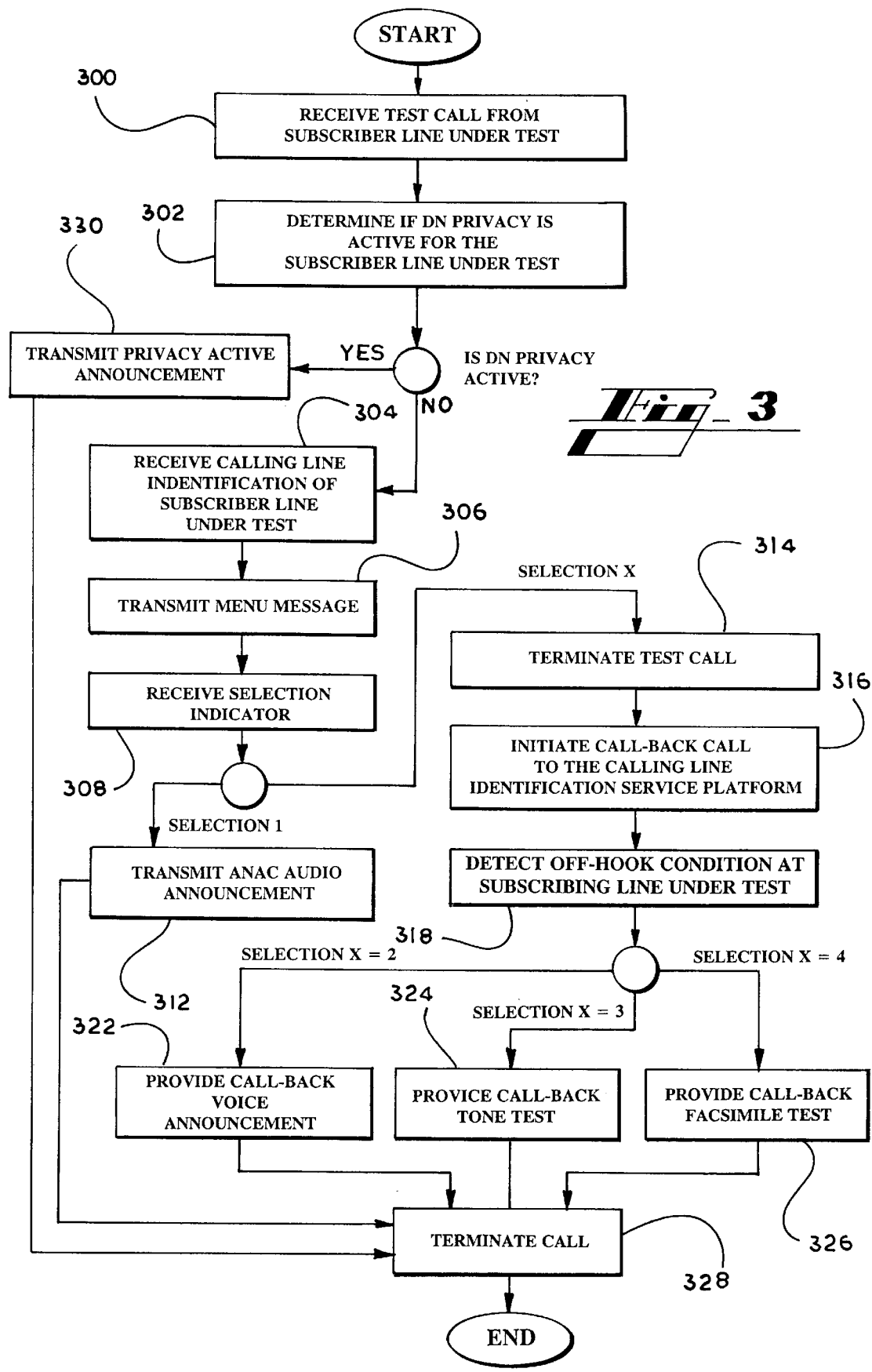

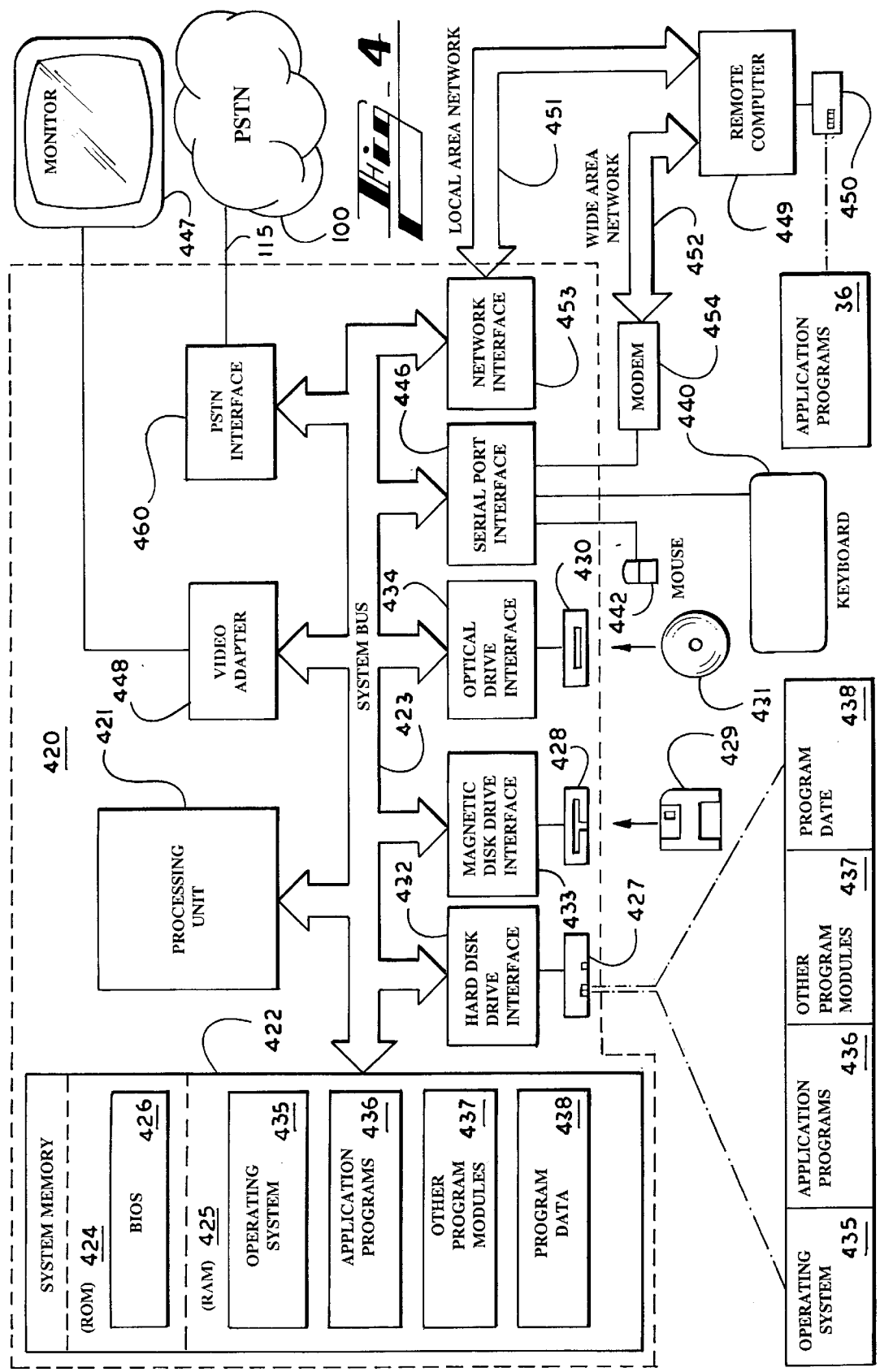

SYSTEM AND METHOD FOR TESTING SUBSCRIBER LINES AND TERMINATING EQUIPMENT FROM A SERVICE PLATFORM

TECHNICAL FIELD

The present invention relates to the field of switched telephony, and in particular, relates to the provision of a service platform based testing system for subscriber lines of a telecommunications system and terminating equipment attached to the subscriber lines.

BACKGROUND OF THE INVENTION

A problem associated with distributed networks and wide area communications systems is the difficulty of performing a closed-loop test of the transmission paths. A closed-loop test is defined as a test which can verify the operation of a transmission path from point A to point B and also from point B to point A. In a distributed network, where point A and point B may be separated by a significant distance, performing a closed-loop test can be especially difficult. One method to perform a closed-loop test is to place a first individual at point A and a second individual at point B. By coordinating their efforts, a signal can be injected into the transmission path at point A by the first individual and the reception can be verified by the second individual at point B. In response, the method can be repeated from point B to point A. Another method to perform a closed-loop test is to provide a loop-back at point B. With a loop-back in place, a signal transmitted from point A will reach point B and then continue back to point A if the transmission paths are operational. Loop-back testing is often utilized in testing systems that are off-line; however, in a live telecommunications system such as the public switched telephone network (PSTN), the use of a loop-back test is impractical.

The public switched telephone network is an example of a telecommunications system which requires a closed-loop testing capability for the various transmission paths. In servicing customers, a telephone service technician may need to verify the operation of a subscriber line or a piece or plurality of pieces of terminating equipment attached to a subscriber line. In the past, this verification has been accomplished by placing a call to a service operator to verify the ability to place an outgoing call from the piece of terminating equipment and/or subscriber line (i.e. point A to point B verification). In addition, the service technician could request the service operator to place a call to the piece of terminating equipment and/or subscriber line under test to verify the ability to receive an incoming call (i.e. point B to point A verification). However, due to the size and complexity of the PSTN, closed-loop testing in this manner is impractical. Thus, there is a need for system and a method to provide a closed-loop test capability for a service technician attempting to verify the operation of a subscriber line or terminating equipment attached to a subscriber line.

Several closed-loop testing techniques have been developed to address this need. One technique is provided within automatic number announcement circuits (ANAC). The ANAC technique consists of a box which can be functionally connected to a central office by means of a dedicated line. In operation, a service technician uses the terminating equipment and/or subscriber line under test to dial a directory number associated with the ANAC's dedicated line. The call is then directed to the ANAC by the central office. The directory number of the subscriber line under test is provided to the ANAC through a service such as calling line identification or some other means. The ANAC converts the directory number of the subscriber line under test into an audio signal and then transmits the audio signal over the transmission path back to the subscriber line under test. Reception of the audio signal at the terminating equipment and/or subscriber line under test verifies the ability to receive audio over the transmission path. The ANAC technique provides the capability to verify that a subscriber line can place outgoing calls and receive audio signals. Further, to provide a full, closed-loop test capability, additional features are necessary to verify the ability to receive calls and transmit audio.

The development of the call-back test system has also addressed, in part, the need for closed-loop testing of subscriber lines. Similar to ANAC's, a call-back test system is connected to a central office by means of a dedicated line having a unique directory number. In operation, a service technician uses the terminating equipment and/or subscriber line under test to dial the unique directory number of the call-back test system. The call is directed to the call-back test system by the central office. The directory number associated with the subscriber line under test is provided to the call-back test system by the central office. After receiving the directory number at the subscriber line under test, the call is then ended. Next, the call-back test system initiates a call to the directory number of the subscriber line under test. Upon detecting an answer to the call, the call-back test system can transmit an audio signal to the subscriber line under test. Reception of the audio signal at the terminating equipment and/or subscriber line under test verifies the ability to receive audio signals. The call back system provides the capability to verify that a subscriber line can place outgoing calls, receive incoming calls and receive an audio signal.

Other systems have been introduced to provide closed-loop testing of transmission paths. These systems include ANAC devices with call-back capabilities and call-back facsimile machines. There are at least two limitations that exist in each of the previous systems. First, the previous systems are central office oriented. This is limiting because duplicate equipment must be purchased for each central office or at least for one central office within each area code. Furthermore, to test subscriber lines which do not have local access to a test system, long-distance calls must be placed to a central office equipped with a test system. The costs associated with long-distance testing of subscriber lines can be significant. Thus, there is a need for a testing system which is accessible from any subscriber line or piece of terminating equipment within a telecommunications system. There is also a need for a toll-free testing system which is accessible from any subscriber line or piece of terminating equipment within a telecommunications system.

Second, the referenced systems do not offer the capability to verify multiple functions of the subscriber line and/or terminating equipment. Today, it is common for a single subscriber line to serve multiple functions. For instance, a subscriber line may be used for receiving telephone calls and for receiving facsimile transmissions. In addition, calling line identification equipment may be either attached to the subscriber line or incorporated into the terminating equipment. Testing each of the functions of a subscriber line being used for multiple purposes (i.e., facsimile, voice, calling line identification, etc.) can be complex. For instance, a service technician is required to call a first number to test one function. Upon completion of this test, the service technician must call a second number to test a second function, and so on. The service technician must maintain a list of the various test numbers and the test functions provided by each. In addition, having a unique directory number for each test system is an inefficient utilization of directory numbers. Thus, there is a need for a service platform which can provide multiple test functions and be accessed by a single directory number.

A service feature which facilitates the ability to test terminating equipment and/or subscriber lines is calling line identification (CLID). CLID is a feature which provides the recipient of an incoming call with information regarding the source or origin of the incoming call. When an incoming call is received on a subscriber line having CLID equipment attached, the CLID equipment detects and decodes a CLID signal. After decoding the signal, the identity of the originating line can be displayed on the equipment or audibly announced. Generally, the identity of the originating line consists of the directory number assigned to the originating subscriber line.

A feature related to calling line identification is dialed number privacy or DN privacy. The DN privacy feature allows an originator of a call to block the transmission of the CLID signal to the called subscriber line. Typically, the DN privacy feature can be activated or de-activated for a given subscriber line by a user dialing a special sequence on a piece of terminating equipment attached to the subscriber line. When the DN privacy feature for an originating subscriber line is in the active state, the signal which provides the calling line identification of the subscriber line is blocked from being transmitted to the called subscriber line. Thus, when active, the DN privacy feature can prevent a call-back test system from being able to verify the operation of a subscriber line or attached terminating equipment. For instance, a call-back test system is usually dependent upon receiving the calling line identification of the subscriber line under test in order to initiate the call-back call. When the transmission of the CLID signal is blocked, the call-back test system can not determine the directory number of the subscriber line under test, and hence, cannot initiate the call-back call. Furthermore, there is generally no mechanism, either visual or audible, which serves to indicate the state of the DN privacy feature for a subscriber line. Thus, if the DN privacy feature is active, a service technician attempting a call-back test may erroneously identify the subscriber line as inoperable to receive calls. Therefore, there is a need for a test system which can determine when the DN privacy feature is active and notify a party or service technician that further testing can not be performed unless the DN privacy feature is turned off.

BRIEF SUMMARY OF THE INVENTION

Generally stated, this invention provides a system and a method for testing, from a single service platform, the operation of subscriber lines and/or terminating equipment attached to a telecommunications system by means of the subscriber lines. Advantageously, the preferred embodiment incorporates a variety of verification tests within a single service platform. The service platform is then functionally connected to a telecommunications network and can be accessed over transmission paths by subscriber lines within the telecommunications network. Thus, the verification tests can be accessed from any subscriber line within the telecommunications network by dialing a specific directory number associated with the service platform. Furthermore, the transmission paths for accessing the service platform can be toll-free paths. Thus, the verification tests can be accessed toll-free from any subscriber line within the telecommunications network by dialing a specific directory number associated with a toll-free transmission path to the service platform.

Specifically, the present invention can be embodied within a telecommunications environment and provide a system for testing the operation of a subscriber line and/or attached termination equipment. The telecommunications environment includes a first switch, serving a subscriber line to be tested, and a second switch, functionally connected to the first switch with a transmission path. The first switch is representative of one of many switches within the telecommunications system. A service platform for providing multiple verification tests is functionally connected to the second switch. In operation, a first switch receives a test call originating from any one of the subscriber lines within the telecommunications system. The test call is then routed to a second switch over the transmission path. The second switch, in turn, routes the test call to the service platform.

The service platform, in response to receiving the test call from the second switch, receives a privacy status indicator for the subscriber line under test. The privacy status indicator can be in one of at least two states including: privacy-active state and privacy-inactive state. The privacy status indicator may, among other things, provide an indication of the state of the dialed number privacy for the subscriber line.

If the received privacy status indicator is set to the privacy-active state, a first announcement message is transmitted from the service platform, over the transmission path, to the terminating equipment attached to the subscriber line under test. After the completion of this transmission, the test call is terminated. If the privacy status indicator is set to the privacy-inactive state, a second announcement message is transmitted from the service platform, over the transmission path, to the terminating equipment attached to the subscribing line under test. The second announcement message may include a menu message identifying one or more verification tests available to test the subscriber line or terminating equipment. In addition, the service platform may determine the calling line identification associated with the subscriber line under test.

After transmitting the menu message, a selection indicator associated with a verification test is received. This may consists of detecting a dialed sequence entered at the subscriber line under test. The selection indicator is evaluated and then a verification test is selected from available verification tests in accordance with the dialed sequence.

In one embodiment of the present invention, four different verification tests are identified in the menu message. Each of the verification tests are associated with a specific dialed sequence. If a first dialed sequence is detected, an audio announcement of the caller identification for the termination line under test is provided. If a second dialed sequence is detected, a call-back voice announcement test service is provided. If a third dialed sequence is detected, a call-back tone test service is provided. If fourth dialed sequence is detected, a call-back facsimile test service is provided.

The present invention also provides a method within a telecommunications system, for testing the operation of a piece of terminating equipment through the use of a network element. First, a test call originating from the piece of terminating equipment under test is received. Second, a transmission path is established from the piece of terminating equipment under test to the network element. Third, a menu message is transmitted over the transmission path to the piece of terminating equipment under test. Fourth, a selection indicator is received over the transmission path, the selection indicator identifying a verification test to be provided. Fifth, the identified verification test is provided.

This method allows for several verification tests to be available. Thus, the menu message transmitted in the third step may contain several menu elements with each element representing one verification test. In one embodiment, four verification tests are provided. These four test include: (1) audio announcement verification test; (2) call-back voice verification test; (3) call-back audio signal verification test; and (4) call-back facsimile verification test.

It is therefore an object of the present invention to provide a testing system which is accessible from any subscriber line within a telecommunications system.

It is also an object of the present invention to provide a toll-free testing system which is accessible from any subscriber line within a telecommunications system.

It is also an object of the present invention to provide a single platform which can provide multiple test functions for subscriber lines and terminating equipment within a telecommunications network.

It is also an object of the present invention to provide a call-back test system which can determine when DN privacy is active and notify a party or service technician that further testing can not be performed unless DN privacy is turned off.

That the present invention accomplishes these objects will be appreciated from the detailed description of the preferred embodiment to follow.

BRIEF DESCRIPTION OF THE DRAWINGS

FIG. 3 is a flow diagram illustrating the steps involved in the preferred embodiment of the present invention.

FIG. 4 is a block diagram of a personal computer that provides an alternative operating environment for an embodiment of the present invention.

DETAILED DESCRIPTION OF THE PREFERRED EMBODIMENT

Figure 1:
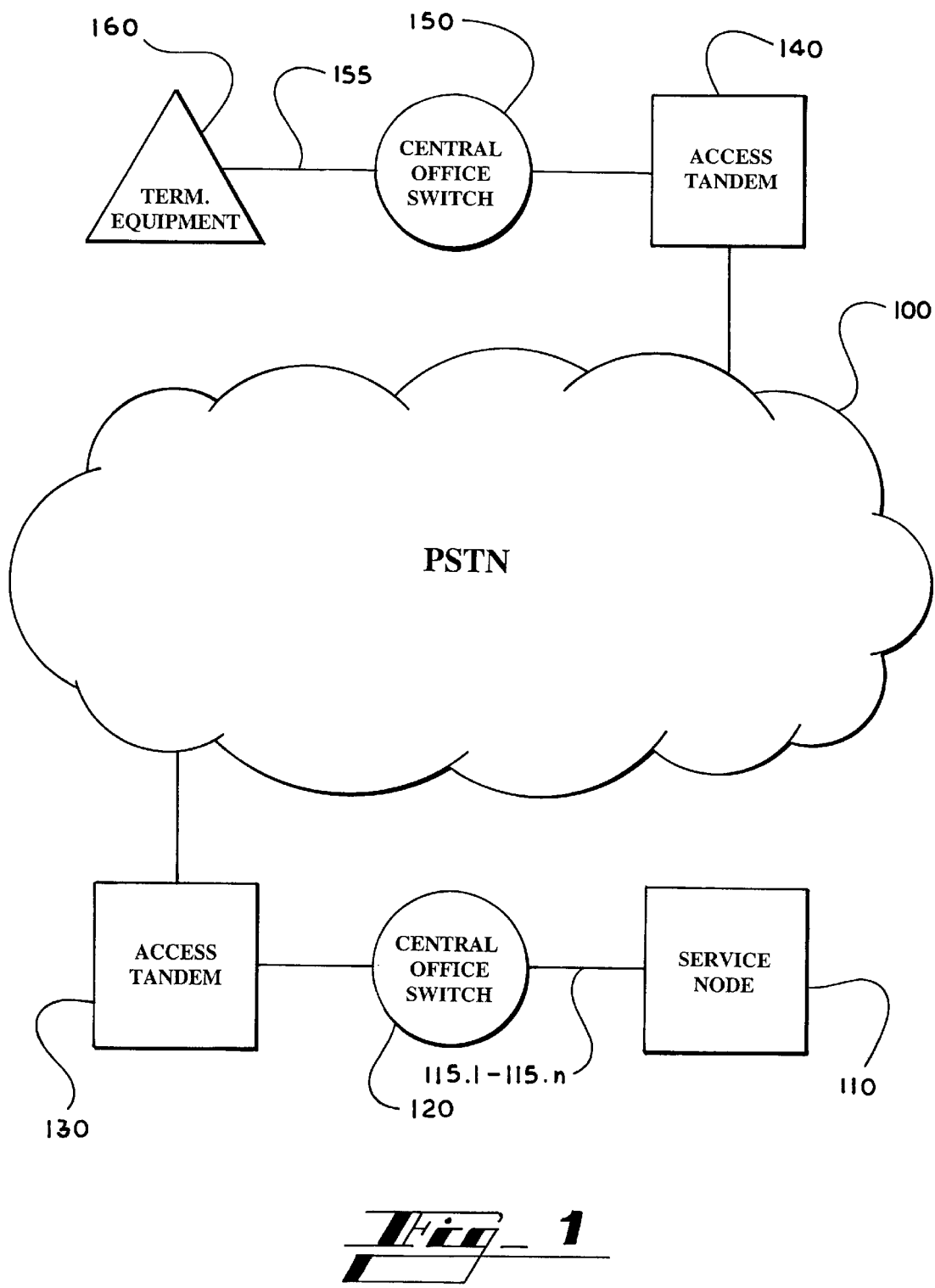
FIG. 1 is a system diagram of a telecommunications network which provides an environment for an embodiment of the present invention.

The present invention provides a system and a method for testing, from a single service platform, the operation of subscriber lines and terminating equipment attached to a telecommunications system by means of the subscriber lines. A variety of verification tests are embodied within a single service platform. The service platform is then functionally connected to a telecommunications network and assigned a special directory number. The service platform can be accessed from the subscriber lines within the telecommunications network. Thus, the verification tests can be accessed from any subscriber line within the telecommunications network by dialing a special directory number associated with the service platform. Furthermore, the service platform can be accessed through toll-free transmission paths selected in response to dialing the special directory number. Thus, the verification test can be accessed toll-free from any subscriber line within the telecommunications network.

Referring now to the drawings in which like numerals represent like elements throughout the several figures, aspects of the present invention and the preferred operating environment will be described.

FIG. 1 illustrates a preferred embodiment of the present invention within network elements attached to the public switched telephone network (PSTN) 100. The preferred embodiment can be viewed as a combination of two components which cooperatively provide the testing capability. The first component functions to detect a call to the testing system and then to route the call over a transmission path to the second component existing on a service platform. The second component functions to receive the call and provide verification and testing of the originating subscriber line. The verification and testing is accomplished by software and/or hardware components which are integrated into the service platform.

A piece of terminating equipment 160 is connected to a first central office switch 150 through a subscriber line 155. The piece of terminating equipment 160 and the subscriber line 155 represent one of many pairs of terminating equipment and subscriber lines which may be tested. The terminating equipment 160 can be a telephone, fax machine, computer modem, calling line identification box, answering machine, etc., or a combination of two or more of these items.

The service platform may include a variety of types of computer systems. In the preferred embodiment, the service platform includes a service node 110 functionally attached to the PSTN 100. Within the PSTN, a service node provides resources for performing specialized services for the PSTN and subscribers. A typical service node 100 has resources such as voice signal detection, DTMF signal recognition, voice synthesis devices, voice digitization, and storage capabilities. A service node is used principally when some enhanced feature or service is needed that requires an audio connection to the caller or transfer of a significant amount of data to a subscriber over a switched connection during or following a call. Services that are implemented during a call (i.e., after completion of ringing or a called subscriber picks up) usually employ the facility of a service node 100. These services include voice mail, facsimile reception and storage. The service node 100 in FIG. 1 is connected to a second central office switch 120 through one or more subscriber lines 115.1–115.n.

The first and second central office switches 120 and 150 are functionally connected to the PSTN 100 through access tandems 130, 140. An access tandem is a local exchange carrier switching system that provides a concentration and distribution function for originating or terminating traffic between central office switches. In the preferred embodiment, an access tandem is utilized for routing a received test call to a service platform over a transmission path. Those skilled in the art of telephony will be familiar with the procedures required to accomplish this task. In an alternate embodiment, an access tandem is utilized for routing a received test call to a service platform over a toll-free transmission path.

Figure 2:
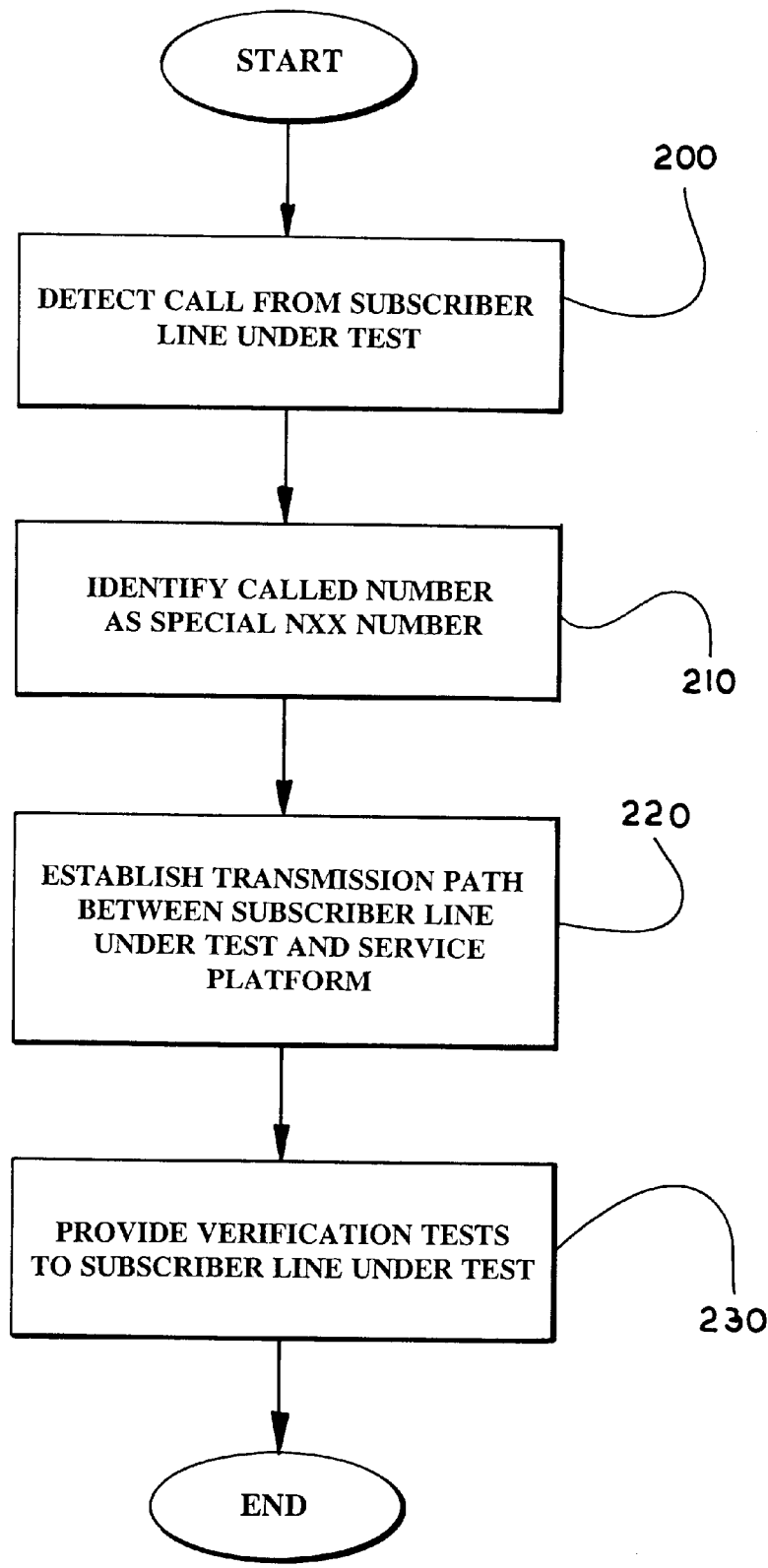
FIG. 2 is a flow diagram illustrating the high level operation of the preferred embodiment of the present invention within the PSTN of FIG. 1.

FIG. 2 is a flow diagram illustrating the high level operation of a preferred embodiment of the present invention within the PSTN of FIG. 1. Each of the steps illustrated in FIG. 2 are described in relation to network elements illustrated in FIG. 1. The process starts at step 200, where a call to the directory number of the service platform and originating from subscriber line 155 is detected at the first central office switch 150. At step 210, the first central office switch 150 examines the NXX of the dialed directory number. If the examined NXX is equal to a specific value (i.e., 780 in the Atlanta Ga. area provides access to a toll-free transmission path), the call is identified as a test call to the service platform. At step 220, a transmission path between the subscriber line under test 155 and the service platform or service node 110 is established. To establish the transmission path, the first central office switch 150 initiates the routing of the test call to the second central office switch 120 serving the service platform or service node 110. The test call is routed from the first central office switch 150 to the second central office switch 120 through access tandems 140 and 130 and any additional network elements functionally connected between these access tandems.

At access tandem 140, the directory number is translated into a ten digit number by including a pseudo NPA or area code. This pseudo NPA is used to identify the call as a test call as it is routed throughout the PSTN. When the test call reaches access tandem 130, the pseudo NPA is replaced with a valid NPA and the call is routed to the second central office switch 120. Finally, the central office 120 rings the service platform or service node 110 over one of the subscriber lines 115.1–115.n. In response to receiving the test call, the service node 10 answers the call and provides verification tests to the subscriber line under test 155 at step 230 where the process ends.

FIG. 3 is a flow diagram illustrating the steps of the preferred embodiment of the present invention operating on a service platform and providing multiple verification tests for a subscriber line under test. The process starts at step 300, where the service platform (service node 110 in FIG. 1) receives a test call, originated from terminating equipment attached to a subscriber line under test. At step 302, the preferred program determines the DN privacy state of the subscriber line under test. The steps involved in making this determination are well known to those skilled in the art and are not described herein. Generally, the service platform receives a privacy status indicator which identifies the current DN privacy state. If DN privacy is in the active state, then processing continues at step 330. If DN privacy is in the inactive state, then processing continues at step 304.

At step 330, DN privacy is in the active state. An announcement is transmitted over the transmission path from the service platform to the terminating equipment. The announcement serves to notify the party at the terminating equipment that dialed number privacy is in the active state and that no further testing can be performed unless dialed number privacy is switched to the inactive state. Additionally, the announcement could identify the steps necessary to deactivate the DN privacy. After transmitting the privacy active announcement, the test call is terminated at step 328 where the process ends.

At step 304, DN privacy is in the inactive state. The calling line identification of the subscriber line under test is then received by the service platform. In an alternate embodiment, the calling line identification can be received in conjunction with determining the state of the DN privacy at step 302. After receiving the calling line identification, a menu message is transmitted to the terminating equipment at step 306. The menu message provides a list of available verification tests that can be selected. In the preferred embodiment, the menu provides the following verification tests:

(1) ANAC
(2) Call-back voice
(3) Call-back tone
(4) Call-back facsimile transmission After transmitting the menu message, a selection indicator which serves to select one of the verification tests, is received at step 308. The selection indicator could include the transmission of a single dial tone multiple frequency (DTMF) signal, a dialed sequence of one or more DTMF or pulse-dial signals, a voice selection, or other indicators. In addition, entering no selection at all may be used as a default selection indicator. If the selection indicator identifies menu item 1, then processing continues at step 312. If the selection indicator identifies any other menu item, processing continues at step 314.

At step 312, menu item 1 has been selected and an ANAC audio announcement is provided. ANAC or automatic number announcement circuit is a device which identifies the directory number of an originating subscriber line, converts the directory number into a voice message, and transmits the voice message to the terminating equipment attached to the originating subscriber line. In the preferred embodiment, the ANAC detects the calling line identification of the subscriber line under test, converts it to an audible signal and transmits the audible signal to the terminating equipment over the transmission path. After providing an ANAC verification test, the test call is terminated at step 328.

Alternatively, at step 314 the test call is terminated by the service platform in preparation for initiating a call-back call to the CLID at step 316. The call-back call is placed to the CLID of the subscriber line under test. In response to initiating the call-back call, the service platform preferably detects when the terminating equipment attached to the subscriber line under test goes off-hook at step 318. The next step in the process depends upon the selection indicator that was received at step 308. If the selection indicator identifies menu item 2, then processing continues at step 322. If the selection indicator identifies menu item 3, processing continues at step 324. Finally, if the selection indicator identifies menu item 4, processing continues at step 326.

At step 322, a call-back voice announcement is transmitted to the terminating equipment attached to the subscriber line under test. This message may include a simple announcement such as "this is your call-back call" or the announcement may include additional information such as the calling line identification of the subscriber line under test. The purpose of this test is to verify that the subscriber line and terminating equipment can receive a call and then receive voice over the transmission line. After the transmission of the voice announcement message, the service platform terminates the call-back call at step 328. Alternatively, step 328 may be performed in response to the terminating equipment attached to the subscriber line under test being placed on-hook.

At step 324, a call-back tone signal is transmitted to the terminating equipment attached to the subscriber line under test. In the preferred embodiment, a 1 m Watt tone at a frequency of 1 KHz is continuously transmitted by the service platform for the duration of the call-back call. This test verifies that the subscriber line and terminating equipment can receive a call and that the transmission path is suitable to receive audio. In addition, the quality of the line can be determined by measuring the distortion to the 1 KHz tone and the signal loss that may have occurred during transmission. This test can also be used to verify the operation of a voice-mail system or answering machine. When the call-back call is answered by a voice-mail system or an answering machine, the service platform begins transmission of the tone. The transmission of the tone continues through any message preamble provided by the voice-mail system or answering machine, and then is recorded by the same. After the transmission of the tone, the service platform terminates the call-back call at step 328. Alternatively, step 328 may be performed in response to the terminating equipment attached to the subscriber line under test being placed on-hook.

At step 326, a call-back facsimile test is initiated. When the call-back call is answered, the service platform initiates the transmission of a facsimile to the terminating equipment by transmitting appropriate signaling information. This test verifies the operation of the facsimile equipment attached to the subscriber line under test. After the transmission of the facsimile is completed or fails, the service platform terminates the call-back call at step 328. Alternatively, step 328 may be performed in response to the terminating equipment attached to the subscriber line under test being placed on-hook.

Another aspect of the present invention is the ability to test the functionality of calling line identification equipment. As illustrated in FIG. 1, several subscribers lines 115.1–115.n are utilized by the service platform 110. Any of these lines can be randomly selected by the service platform when placing a call-back call to the subscriber line under test. Thus, if calling line identification equipment is attached to the subscriber line under test, selecting any of the call-back call verification tests results in exercising the operation of the calling line identification equipment.

FIG. 4 provides a general description of an alternate embodiment of the second component of the present invention. This embodiment is described in the general context of an application program that runs on an operating system in conjunction with a personal computer. Those skilled in the art will recognize that the alternate embodiment also may be implemented in combination with other program modules. Generally, program modules include routines, programs, components, data structures, etc. that perform particular tasks or implement particular abstract data types. Moreover, those skilled in the art will appreciate that this embodiment may be practiced with other computer system configurations, including hand-held devices, multiprocessor systems, microprocessor-based or programmable consumer electronics, minicomputers, mainframe computers, and the like. This embodiment may also be practiced in distributed computing environments where tasks are performed by remote processing devices that are linked through a communications network. In a distributed computing environment, program modules may be located in both local and remote memory storage devices.

With reference to FIG. 4, a service platform for housing the second component of the alternate embodiment of the present invention includes a conventional personal computer 420, including a processing unit 421, a system memory 422, and a system bus 423 that couples the system memory to the processing unit 421. The system memory 422 includes read only memory (ROM) 424 and random access memory (RAM) 425. A basic input/output system 426 (BIOS), containing the basic routines that help to transfer information between elements within the personal computer 420, such as during start-up, is stored in ROM 424. The personal computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage for the personal computer 420. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438. A user may enter commands and information into the personal computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a game port or a universal serial bus (USB). A monitor 447 or other type of display device is also connected to the system bus 423 via an interface, such as a video adapter 448. In addition to the monitor, personal computers typically include other peripheral output devices (not shown), such as speakers or printers.

The personal computer 420 may operate in a networked environment using logical connections to one or more remote computers, such as a remote computer 449. The remote computer 449 may be a server, a router, a peer device or other common network node, and typically includes many or all of the elements described relative to the personal computer 420, although only a memory storage device 450 has been illustrated in FIG. 4. The logical connections depicted in FIG. 4 include a local area network (LAN) 451 and a wide area network (WAN) 452. Such networking environments are commonplace in offices, enterprise-wide computer networks, intranets and the Internet.

When used in a LAN networking environment, the personal computer 420 is connected to the LAN 451 through a network interface 453. When used in a WAN networking environment, the personal computer 420 typically includes a modem 454 or other means for establishing communications over the WAN 452, such as the Internet. The modem 454, which may be internal or external, is connected to the system bus 423 via the serial port interface 446. In a networked environment, program modules depicted relative to the personal computer 420, or portions thereof, may be stored in the remote memory storage device. It will be appreciated that the network connections shown are exemplary and other means of establishing a communications link between the computers may be used.

The personal computer 420 may be provided with interface hardware and software for a variety of systems and applications. For instance, the personal computer 420 could be connected to the PSTN 100 shown in FIG. 1 through a PSTN interface card 460. The personal computer may be attached to the PSTN 100 by connecting a subscriber line 115 between the PSTN 100 and the PSTN interface card 460. Alternatively, a T1 line or other means may be used to connect the personal computer 420 to the PSTN 100.

The PSTN interface card 460 may provide resources such as voice signal detection; DTMF signal recognition; voice synthesis; and voice digitization. Alternatively, these resources could be provided by application programs 436 operating on the personal computer 420 or by a combination of the application programs 436 and the PSTN interface card 460. This embodiment of the present invention can then exist as an application program 436 operating on the personal computer 420.

The present invention has been described in relation to particular embodiments which are intended in all respects to be illustrative rather than restrictive. Those skilled in the art will understand that the principles of the present invention may be applied to, and embodied in, various types of telecommunication equipment and systems. Those skilled in the art will also understand that the present invention may be utilized to provide a variety of network-based services only some of which have been identified herein.

Alternate embodiments will become apparent to those skilled in the art to which the present invention pertains without departing from its spirit and scope. Therefore the scope of the present invention is to be limited only by the claims below and equivalents thereof.

We claim:

1. In a telecommunications environment, a system for testing the operation of a subscriber line and attached terminating equipment, comprising:
   a first switch serving a subscriber line under test;
   a second switch functionally connected to the first switch by a transmission path;
   a service platform functionally connected to the second switch;
   the first switch being operative:
      to receive a test call originating in connection with the subscriber line under test, and
      to utilize the transmission path to route the test call to the second switch;
   the second switch being operative to route the test call to the service platform;
   the service platform being operative, in response to receiving the test call from the second switch, to receive in connection with the test call, a privacy status indicator for the subscriber line under test, the privacy status indicator being set to one of a plurality of states including a privacy-active state and a privacy-inactive state; and
   the service platform being further operative:
      if the privacy status indicator is set to the privacy-active state, to transmit a first announcement message from the service platform, over the transmission path, to the terminating equipment attached to the subscriber line under test, and
      then to terminate the test call; and
      if the privacy status indicator is set to the privacy-inactive state, to transmit a second announcement message from the service platform, over the transmission path, to the terminating equipment attached to the subscribing line under test;
      in response to transmission of the second announcement message, to receive a selection indicator associated with a verification test,
      and to provide the verification test.

2. The system of claim 1, wherein the second announcement message comprises a menu message, wherein the selection indicator comprises a dialed sequence operative to identify one of a plurality of verification tests itemized in the menu message, and
   the service platform is further operative:
      to detect the dialed sequence; and
      to provide the verification test selected from the plurality of verification tests in accordance with the dialed sequence.

3. The system of claim 1, wherein the service platform is further operative to determine a calling line identification associated with the subscriber line under test, if the privacy status indicator is set to the privacy-inactive state.

4. The system of claim 3, wherein the second announcement message comprises a menu message, wherein the selection indicator comprises a dialed sequence operative to identify one of a plurality of verification tests itemized in the menu message, and
   the service platform is further operative:
      to detect the dialed sequence;
      if a first dialed sequence is detected, to provide an audio announcement of the calling line identification for the subscriber line under test;
      if a second dialed sequence is detected, to provide a call-back voice announcement test service;
      if a third dialed sequence is detected, to provide a call-back tone test service; and
      if a fourth dialed sequence is detected, to provide a call-back facsimile test service.

5. The system of claim 1, wherein the transmission path is a toll-free transmission path.

6. In a telecommunications environment, a method for testing the operation of a subscriber line and terminating equipment functionally connected to the subscriber line, comprising the steps of:
   receiving, at a switch serving the subscriber line, a test call originating in connection with the subscriber line;
   routing the test call from the switch to a service platform;
   in response to receiving the test call from the switch, causing the service platform to receive, in connection with the test call, a privacy status indicator for the subscriber line;
   transmitting an announcement from the service platform to the terminating equipment;
   if the privacy status indicator is set to a privacy-inactive state, transmitting an announcement message from the service platform to the terminating equipment;
   in response to transmission of the announcement message, receiving a selection indicator associated with a verification test; and
   providing the verification test.

7. The method of claim 6, further comprising the steps of:
   if the privacy status indicator is set to a privacy-active state, transmitting an announcement message from the service platform to the terminating equipment; and
   ending the test call.

8. The method of claim 6, wherein said step of transmitting an announcement from the service platform to the terminating equipment includes transmitting a menu message to the terminating equipment, the menu message containing at least one menu element, each menu element representing one of a plurality of verification tests.

9. The method of claim 8, wherein the step of providing the verification test further comprises providing an audio announcement if the selection indicator is associated with a menu element representing an audio announcement verification test.

10. The method of claim 8, wherein the step of providing the verification test further comprises providing a call-back voice verification test if the selection indicator is associated with a menu element representing a call-back voice verification test.

11. The method of claim 8, wherein the step of providing the verification test further comprises providing a call-back audio signal verification test if the selection indicator is associated with a menu element representing a call-back audio signal verification test.

12. The method of claim 8, wherein the step of providing the verification test further comprises providing a call-back facsimile verification test if the selection indicator is associated with a menu element representing a call-back facsimile verification test.

13. The method of claim 9, further including the steps of:
   receiving a calling line identification of a subscriber line associated with the terminating equipment; and converting the calling line identification so that it may be used as the audio announcement.

14. The method of claim 13 further including the steps of:

using the calling line identification to initiate a transmission path; and transmitting additional information over the transmission path after detecting an off-hook condition of the terminating equipment.

15. The method of claim 13 further including the step of:

transmitting the audio announcement over a transmission path after detecting an off-hook condition of the terminating equipment.

16. The method of claim 10, wherein said step of transmitting an announcement from the service platform to the terminating equipment includes establishing a first transmission path from the terminating equipment to the service platform; and wherein the step of receiving a selection indicator associated with a verification test includes initiating a second transmission path from the service platform to the terminating equipment.

17. The method of claim 16, wherein the step of providing the call-back voice verification test further comprises:

receiving a calling line identification of a subscriber line associated with the terminating equipment; and using the calling line identification to initiate the second transmission path.

18. The method of claim 16, wherein the step of establishing the first transmission path further comprises selecting a toll-free transmission path.

19. The method of claim 11, wherein said step of transmitting an announcement from the service platform to the terminating equipment includes establishing a first transmission path from the terminating equipment to the service platform; and wherein the step of receiving a selection indicator associated with a verification test includes initiating a second transmission path from the service platform to the terminating equipment.

20. The method of claim 19, wherein the step of providing the call-back audio signal verification test further comprises:

receiving a calling line identification of a subscriber line associated with the terminating equipment; and using the calling line identification to initiate the second transmission path.

21. The method of claim 12, wherein said step of transmitting an announcement from the service platform to the terminating equipment includes establishing a first transmission path from the terminating equipment to the service platform; and wherein the step of receiving a selection indicator associated with a verification test includes initiating a second transmission path from the service platform to the terminating equipment.

22. The method of claim 21, wherein the step of providing the call-back facsimile verification test further comprises:

receiving a calling line identification of a subscriber line associated with the terminating equipment; and using the calling line identification to initiate the second transmission path.

* * * * *